United States Patent [19]

Wulff

[11] 4,291,436

[45] Sep. 29, 1981

[54] APPARATUS FOR EXTRACTING THE ENTRAILS AND/OR CLEANING THE BELLY CAVITY OF FISH

[75] Inventor: Hermann Wulff, Lübeck, Fed. Rep. of Germany

[73] Assignee: Nordischer Maschinenbau Rud. Baader GmbH & Co. KG, Lübeck, Fed. Rep. of Germany

[21] Appl. No.: 101,091

[22] Filed: Dec. 7, 1979

[51] Int. Cl.³ .............................................. A22C 25/14
[52] U.S. Cl. ............................................................... 17/59
[58] Field of Search ...................... 17/58, 59, 60, 51, 52

[56] References Cited

U.S. PATENT DOCUMENTS

| | | | |
|---|---|---|---|
| 2,775,785 | 1/1957 | Kurzbin | 17/59 |
| 4,091,506 | 5/1978 | Soerensen et al. | 17/58 X |

*Primary Examiner*—Willie G. Abercrombie
*Attorney, Agent, or Firm*—Edward F. Levy

[57] ABSTRACT

An apparatus for extracting the entrails and/or cleaning the belly cavity of decapitated fish comprises an endless conveyor belt advancing the fish, a head belt associated to the conveyor belt and supporting the heads, and a decapitating knife extending between these belts, behind which decapitating knife there is arranged a suction device, which is arranged downstream and decapitating knife in the plane of the same, connected to a source of low pressure or vacuum and comprises a suction chamber and a suction opening. Inside the suction chamber there is arranged directly behind the suction opening a vane roller mounted to be driven, which together with the suction chamber forms a clamping or gripping face for physically gripping and extracting the entrails sucked into the suction opening. In front of the suction opening there is arranged a screen to be lifted by the fish and enabling a controlling of the suction section depending on the size of the fish.

11 Claims, 3 Drawing Figures

U.S. Patent    Sep. 29, 1981    4,291,436
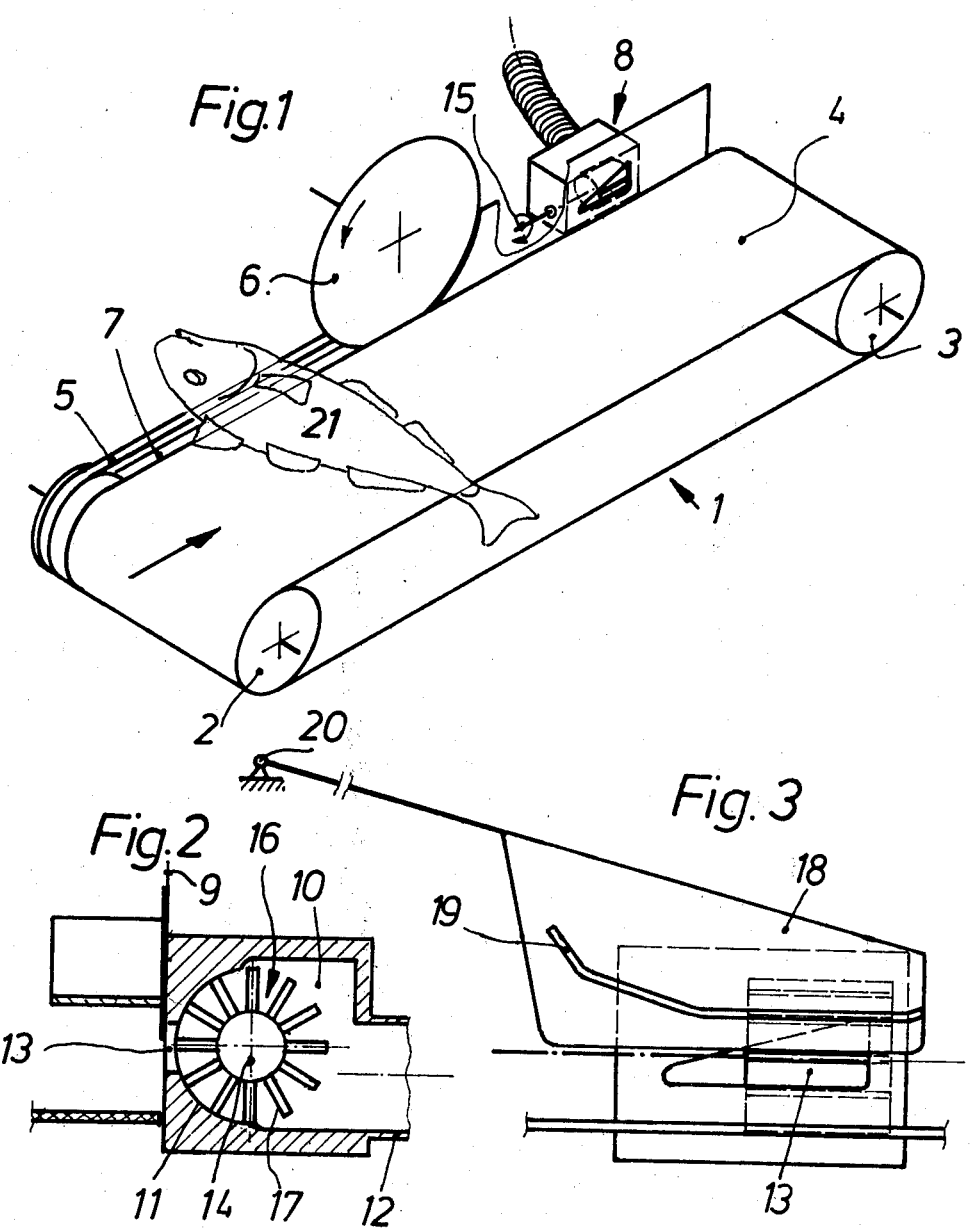

APPARATUS FOR EXTRACTING THE ENTRAILS AND/OR CLEANING THE BELLY CAVITY OF FISH

BACKGROUND OF THE INVENTION

1. Field of the Invention

The invention concerns an apparatus for extracting the entrails and/or cleaning the belly cavities of decapitated fish, said apparatus comprising a conveyor for advancing the fish essentially transversely to their longitudinal axes and with their decapitation faces lying in a plane of decapitation essentially perpendicular to the conveying plane, and a suction device having a suction opening lying essentially in said decapitation plane.

2. Description of Prior Art

From U.S. Pat. No. 2,775,785 there is known a gutting apparatus, in which there is arranged a gutting device to which there is connected a suction device adjacent of a conveyor for transversely positioned fish and behind a circular knife for cutting off the heads of the fish. The suction aperture of the gutting device is connected to and separated from the suction device rhythmically according to the passage of the conveyor elements by a rotary slide or screen.

This gutting apparatus is an improved embodiment of known apparatus for producing nobbed sardines or herrings. In these generally known apparatus the entrails must be sucked out during the passage of the opened head end of the belly cavity in front of the suction device within a very short period. With respect to such known apparatus the gutting apparatus of U.S. Pat. No. 2,775,785 shows the advantage of the suction head being guided against the head end of the belly cavity of the fish and together with this over a smaller part of the conveying path of the fish. This enables the reduction of the necessary suction power. However, it is not possible to gut and remove the entrails reliably with this gutting apparatus, since the forces exertable upon the entrails by the low pressure do not suffice to detach the ligaments or other anchorages of the entrails within the belly cavity in a reliable manner, this disadvantage being particularly present in the event of rather tough or tenacious anchorages.

OBJECT OF THE INVENTION

It is one of the main objects of the invention to improve such known gutting apparatus such that parts of the entrails anchored by ligaments or otherwise fixedly in the region of the anus of the fish may be detached from the fish.

It is another particular object of the invention to enable the reliable and efficient removal of parts of the entrails being rather long or of large volume such as present in larger fish.

BRIEF SUMMARY OF THE INVENTION

According to the present invention an apparatus for extracting the entrails and/or cleaning the belly cavities of the decapitated fish comprises a conveyor for advancing the fish essentially transversely to their longitudinal axes and with their decapitation faces lying in a decapitation plane essentially perpendicular to the conveying plane, a suction device having a suction opening lying essentially in said decapitation plane, and means arranged behind said suction opening in said suction device for a pinching-like seizure of those parts of the belly contents of the fish which have been sucked into said suction opening and for extracting the same from the belly cavity.

Essential advantages achieved by such an arrangement consist in that all parts of the entrails protruding at the decapitation cut plane from the belly cavity may be extracted reliably from the latter, so that with this apparatus it is not only possible to gut smaller fish such as herrings, sardines or the like, which are normally processed by nobbing, but also such larger fish as e.g. fish of the gadide species, which subsequently have or are to be processed by filleting.

Preferably the means for seizing and extracting said belly parts may comprise a tool driven to rotate and clamping face means closely spaced from the circumferential face of said tool. Thus, above all it is rendered possible to remove safely from the belly cavity parts of the entrails having greater lengths as well as entrails of larger fish.

In order to be particularly able to remove parts of the entrails of a large volume from the belly cavity in a reliable manner, the tool may comprise a vane roller or the like means.

Expediently the tool or the vane roller may be mounted to rotate about an axis arranged essentially parallel to the conveying plane. This arrangement enables the suction opening to be provided with a greater length when seen in the conveying direction of the fish and thereby to facilitate the extraction of entrails of greater lengths.

According to a further embodiment of the invention the circumferential plane of the tool or the vane roller may be situated in the region of the suction opening at a slight distance from the decapitation plane. Thus, it is guaranteed that parts of the contents of the belly cavity of even smaller fish may be seized accurately and reliably, too.

Also, the circumferential face of the tool or vane roller means may cover the suction opening at least partially in order to make possible a continuous entering of the entrails between the vanes of the vane roller without any interruption of the traction on the entrails effected by the suction.

In order to safeguard a quick and effective conveying of the seized and extracted parts of the entrails, the clamping face may be arranged between the suction opening and a suction socket connected to a source of low pressure or partial vacuum.

Advantageously, the vane roller should comprise vanes of an elastic material. This allows for a seizing of extremely thin intestines and guts of smaller fish and for extracting them cautiously without the danger of tearing.

Preferably, there may be arranged a screen or similar means closely in front of the suction opening, which screen covers said opening, is arranged to be lifted and pivoted about a pivoting axis arranged perpendicular to the decapitation plane, and comprises a sliding face rising above the conveying face and being liftable by the fish. Such a preferred embodiment makes it possible to achieve an automatic adaptation of the respectively available cross section of the suction opening in dependence on the respective fish size as well as the clearing of the suction opening only when a fish is present.

According to a further embodiment of the invention the suction opening may be arranged to expand upwardly in the conveying direction of the fish. This safeguards a reliable gutting of fish having varying thicknesses.

In order to enable a staff saving combination of the processing steps of decapitating and gutting, a nobbing tool or a decapitating knife may be arranged in the plane of decapitation upstream of the suction opening.

BRIEF DESCRIPTION OF THE DRAWINGS

Other and further objects of the present invention will be apparent from the following description and claims and are illustrated in the accompanying drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the schematic drawings,

FIG. 1 shows a perspective view of a decapitating and gutting apparatus according to the present invention, FIG. 2 shows a sectional view at an enlarged scale through the suction chamber of the suction device seen in a direction contrary to the conveying direction, and FIG. 3 shows a lateral view of a screen covering of the suction opening, also at an enlarged scale with respect to FIG. 1.

DETAILED DESCRIPTION OF THE PREFERRED EMBODIMENT

In a machine frame (not shown) there are mounted an idler roller 2 and a drive roller 3 of a conveyor 1 which may be arranged horizontally or in an ascending manner. The drive roller 3 is driven by known means. An endless conveyor belt 4 and an also endless head belt 5 turn around the idler roller 2 and the drive roller 3. Between these two belts there is a slot 7. The conveyor belt 4 and the head belt 5 are driven in the conveying direction as indicated by an arrow not designated by a reference numeral. In the slot 7 there is arranged a head or decapitating knife 6, the lower part of which extends below the conveyor belt 4. The head knife 6 defines a decapitation cut plane 9, in which there is arranged a suction device 8 together with its suction opening 13 downstream of the head knife 6. A guiding surface may be arranged in a known per se manner between the head kife 6 and the suction device 8.

The suction device 8 comprises a suction chamber 10, which opens towards the conveyor belt 4 by means of the suction opening 13 and which is connected to a source of low pressure by means of a suction socket 12. A vane roller 14 is arranged to be driven in the direction of the peripheral arrow shown in FIG. 1 about an axis of rotation 15 which is parallel to the conveying direction. A clamping face 11 is associated to the lower part of the peripheral or circumferential face of the vane roller 14. This clamping face 11 is circular-shaped. The vane roller 14 comprises a hub, to which there are fixed vanes 17 extending essentially parallel to the axis of rotation 15. These vanes 17 may consist of an elastomeric material such as e.g. a polyurethane-elastomer.

As a cover for the suction opening 13 there is arranged a screen 18 within the decapitation cut plane closely in front of the suction opening and pivotable about a pivoting axis 20 which is arranged fixedly with respect to the frame. On its side facing the conveyor belt 4 the screen 18 is provided with a sliding face 19.

The function of the apparatus is as follows:

A fish 21 placed on the conveyor belt 4 in a transversal direction to the latter and lying on its side is adjusted manually or by mechanical means known per se such that the back edges of its collar bones lie above the edge of the conveyor belt 4 facing the slot 7. On the advancing of the fish 21 by means of the conveyor belt 4 and the head belt 5 the head of the fish is severed by means of the head knife 6. During its further advance by the conveyor belt 4, the head end of the remaining fish body arrives underneath the sliding face 19. The displacement of the latter causes a lifting of the screen 18 and consequently a respective opening or clearing of the suction opening 13, so that the fish arrives in front of the suction opening 13 with its belly cavity end which has been opened by the decapitation cut. Through the low pressure or vacuum existing inside the suction opening 13, the contents of the belly cavity of the fish 21 are sucked out of the belly cavity and reach the effective area of the vanes 17 of the vane roller 14. The vanes 17 press these sucked-out parts against the clamping face 11 and, at high speed, pull them along the latter out of the belly cavity. Upon leaving the clamping face 11 these parts are conveyed by the air current inside the suction socket 12.

By this process it is not only possible to gut sardines, pilchards, herrings or similar fish, but also fish which are to be filleted such as cod-like fish, Norwegian haddock, redfish or others.

What is claimed is:

1. An apparatus for extracting the entrails and/or cleaning the belly cavities of decapitated fish, said apparatus comprising
a conveyor for advancing the fish essentially transversely to their longitudinal axes and with their decapitation faces lying in a decapitation plane essentially perpendicular to the conveying plane,
a suction device having a suction opening lying essentially in said decapitation plane, and
means arranged behind said suction opening in said suction device for physically gripping those parts of the belly contents of the fish which have been sucked into said suction opening and for extracting the same from the belly cavity.

2. An apparatus as claimed in claim 1, wherein said means for seizing and extracting said belly parts comprise
a suction chamber in said suction device communicating with said suction opening and having a gripping surface, and
a tool driven to rotate within said suction chamber and defining a circumferential surface,
the circumferential surface of said tool being positioned closely adjacent to said gripping surface and forming a gripping gap therebetween.

3. An apparatus as claimed in claim 2, wherein said tool comprises vane roller means.

4. An apparatus as claimed in claim 2 or 3, wherein said tool is mounted to rotate about an axis arranged essentially parallel to the conveying plane.

5. An apparatus as claimed in claim 2 or 3, wherein said circumferential plane of said tool lies in the region of said suction opening at a slight distance from said decapitation plane.

6. An apparatus as claimed in claim 2 or 3, wherein said circumferential face of said tool at least partially covers said suction opening.

7. An apparatus as claimed in claim 2 or 3, wherein said gripping surface is arranged between said suction opening and a suction socket connected to a source of low pressure or partial vacuum.

8. An apparatus as claimed in claim 3, wherein said vane roller means comprises vanes of an elastic material.

9. An apparatus as claimed in claim 1 wherein there are arranged screen means closely in front of said suction opening, said screen means covering said opening, being arranged to be lifted and pivoted about a pivoting axis arranged perpendicular to said decapitation plane, and comprising a sliding face rising above said conveying face and being liftable by the fish.

10. An apparatus as claimed in claim 1, wherein said suction opening is arranged to expand upwardly in the conveying direction of the fish.

11. An apparatus as claimed in claim 1, wherein one of nobbing tool means and a decapitating knife are arranged in said decapitation plane upstream of said suction opening.

* * * * *